Dec. 24, 1946.        A. H. SWANSON        2,413,120
MEASURING AND CONTROLLING APPARATUS
Filed Oct. 6, 1942

INVENTOR.
ARTHUR H. SWANSON
BY
C. B. Spangenberg
ATTORNEY.

Patented Dec. 24, 1946

2,413,120

UNITED STATES PATENT OFFICE 2,413,120

MEASURING AND CONTROLLING APPARATUS

Arthur H. Swanson, Lafayette Hill, Pa., assignor to The Brown Instrument Company, Philadelphia, Pa., a corporation of Pennsylvania Application October 8, 1942, Serial No. 461,267

11 Claims. (Cl. 172—239)

This invention broadly relates to control systems and more particularly to systems for measuring, exhibiting and/or controlling a variable condition such as temperature.

One object of this invention is to provide a novel control system for a multiphase reversible electric motor. In this respect the reversible electric motor may be controlled by transformer means having a pair of primaries to which alternating potentials of variable relative magnitudes are applied to energize oppositely the transformer means to cause operation of the reversible electric motor in one direction or the other.

Further objects of the invention are to provide follow-up or rebalancing means in the control system, to control the system in accordance with the value of a variable condition and to measure, exhibit and/or control the variable condition by the control system.

Another object of this invention is to provide a novel condition responsive device which may take the form of an electronic discharge device directly responsive to the value of the variable condition and which may be advantageously utilized in the aforementioned control system.

The various features of novelty which characterize this invention are pointed out with particularity in the claims annexed to and forming a part of this specification. For a better understanding of the invention, however, its advantages and specific objects obtained with its use, reference should be had to the accompanying drawing and descriptive matter in which is illustrated and described a preferred embodiment of the invention.

Figure 1:
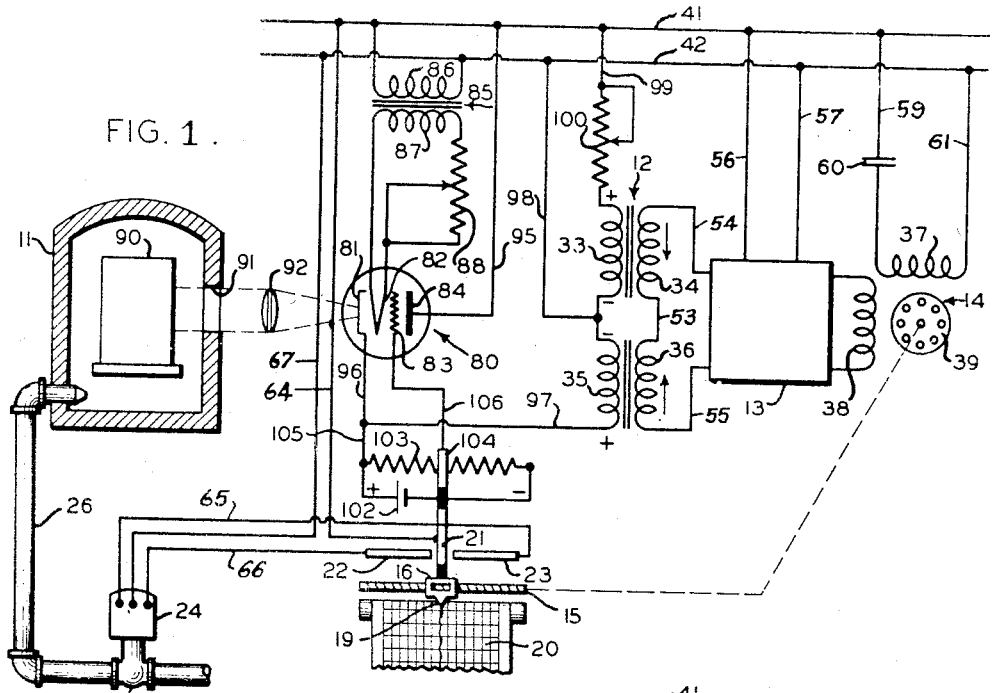
Fig. 1 is a diagrammatic illustration of one form of the invention.

Referring now to Fig. 1, a condition responsive device in the form of a device responsive to temperature conditions is generally designated at 80 and is so located that it responds to a temperature condition within a furnace 11. The condition responsive device 80 controls the application of an alternating potential to a transformer means generally designated at 12 which in turn applies an alternating potential to an electronic amplifier 13. The amplified alternating potential from the amplifier 13 is applied to a multiphase reversible electric motor generally designated at 14, and as will be pointed out hereafter, the reversible electric motor 14 assumes positions corresponding to the value of the temperature condition existing within the furnace 11. The reversible electric motor 14 operates a screw shaft 15 which reciprocates a carriage 16. The carriage 16 carries a contact 104 which slidably engages a resistance 103. The carriage 16 reciprocated by reversible electric motor 14 assumes positions corresponding to the value of the temperature condition existing within the furnace 11 and, therefore, acts to exhibit the value of that condition. A stylus or pen 19 records the value of the temperature condition on a continuously moving chart 20. The carriage 16 also operates a contact 21 with respect to a pair of contacts 22 and 23 for controlling the operation of a reversible electric motor 24 which in turn positions a valve 25 in the fuel line 26 leading to the furnace 11. The contacts 22 and 23 may be adjusted for predetermining the temperature condition to be maintained within the furnace 11.

The temperature responsive device 80 is an electronic discharge device having an envelope containing a cathode 81, a cathode heater 82, a control grid 83, and an anode 84. The cathode 81 is subjected to the temperature condition within the furnace 11 and emits electrons in accordance with the temperature condition prevailing within the furnace 11. This electron emission by the cathode 81 varies the conductance from the anode to the cathode in accordance with the temperature condition in the furnace 11.

As shown, power is supplied to the cathode heater 82 by means of a transformer 85 having a primary 86 connected across the line wires 41 and 42 and a secondary 87 connected to the cathode heater 82. A rheostat 88 in series with the cathode heater 82 may be utilized for regulating the heating effect of the cathode heater 82. If there is any possibility of voltage fluctuation in the supply lines 41 and 42 this may be remedied by making the transformer 85 a constant voltage transformer or by substituting a battery for the transformer 85.

The cathode heater 82 is utilized for partially heating the cathode 81. The main supply of heat for the cathode 81 comes from the temperature condition within the furnace 11. The arrangement of Figure 1 while capable of responding to temperature conditions generally in the furnace 11 is particularly adaptable for use as a radiation responsive instrument and has been so illustrated in Fig. 1. Located within the furnace 11, in Fig. 1, is a mass 90 being heated. Radiation from the mass 90 is in accordance with the temperature thereof. Radiant energy from the mass passes through an opening 91 in the wall of the furnace 11 and is focussed by a lens system 92 on the cathode 81. The cathode 81 is, therefore, heated by radiant energy emanating from the mass 90 and is heated in accordance with the temperature of the mass 90. The amount of electron emission by the cathode 81 is, therefore, proportional to the temperature of the mass 90.

The transformer means generally designated at 12 includes a pair of transformers, one of the pair having a primary 33 and a secondary 34 and the other of the pair having a primary 35 and a secondary 36. The multiphase reversible electric motor 14 includes a power winding 37, a control winding 38, and a rotor 39.

An alternating potential is applied to the control system by line wires 41 and 42 leading from a source of alternating potential not shown. Assume that during the first half cycle the line wire 41 is positive with respect to the line wire 42 and that conditions are reversed on the second half cycle.

The transformer primary 35, as shown, is included in the output circuit of the electronic temperature responsive device 80 which may be traced from the line wire 41 through conductor 95, anode 84, cathode 81, conductors 96 and 97, transformer primary 35 and conductor 98 to line wire 42. During the first half cycle a pulse of current through the output circuit is applied to the primary 35 to induce a current flow in the secondary 36 in the upward direction as is illustrated by the arrow in Fig. 1. During the second half cycle the electronic temperature responsive device 80 does not conduct but due to the construction of the transformer means 12 a current flow is produced in the opposite direction in the secondary 36. The primary 33 is included in a circuit extending from the line wire 41 through the rheostat 100, primary 33 and conductor 98 to line wire 42. During the first half cycle a current flow is induced in the secondary 34 in a downward direction as illustrated by the arrow in Fig. 1 and during the second half cycle this current flow is reversed. The current flows in the secondaries 34 and 36 are opposed and when these current flows are equal no signal is impressed on the amplifier 13 and on the control winding 38. The transformer secondaries 34 and 36 are connected in series in the input circuit of the electronic amplifier 13 by conductors 53, 54 and 55. Power is supplied to the amplifier 13 by means of conductors 56 and 57 leading from the line wires 41 and 42. The output circuit from the electronic amplifier 13 includes the control winding 38 of the reversible electric motor 14. The power winding 37 is connected across the line wires 41 and 42 by conductors 59 and 61 and a condenser 60 located in the conductor 59, operates to cause the potential drop across the power winding 37 to lead the alternating potential of the line wires 41 and 42 by a suitable angle, for example 90°. When the current flows through the secondaries 34 and 36 are equal and opposite, this being the case when the system is balanced, no signal is impressed upon the electronic amplifier 13 and no potential drop is produced across the control winding 38 and the reversible electric motor 14 remains stationary. When the temperature condition within the furnace 11 increases, the current flow in the secondary 36 predominates over the current flow in the secondary 34 to produce a signal for the amplifier 13 which is in phase with the line voltage to produce a potential drop across the control winding 38 which lags the potential drop across the power winding 37 to energize the reversible motor 14 for rotation in a direction to move the carriage 16 to the right. Upon a decrease in the temperature condition within the furnace 11 the current flow through the secondary 34 predominates over that in the secondary 36 to apply a signal to the electronic amplifier 13 which is 180° out of phase with the line voltage. This produces a potential drop across the control winding 38 which leads the potential drop across the power winding 37 to rotate the reversible electric motor 14 in the opposite direction and to move the carriage 16 to the left.

Follow-up or rebalancing control is accomplished in Fig. 1 by varying the potential of the grid 83 to restore the current flow induced in the secondary 36 to a value which is equal and opposite to the current flow in the secondary 34. In this connection a battery 102 is utilized to place a potential drop across the resistance 103 which is engaged by the contact 104 operated by the carriage 16. The left end of the resistance 103 is positive with respect to the right end and is connected by conductors 96 and 105 to the cathode 81. The contact 104 is connected to the grid 83 by conductor 106. The battery 102 operating through the resistance 103 and contact 104 places a negative potential on the grid 83 which potential is dependent upon the position of the contact 104 with respect to the resistance 103.

When the temperature condition in the furnace 11 increases to increase the current flow induced in the secondary 36 the carriage 16 is moved to the right to place a more negative potential on the grid 83. This reduces the current flow induced in the secondary 36 and when the current flow in the secondary 36 becomes equal and opposite to the current flow in the secondary 34 rotation of the reversible electric motor 14 is stopped. Likewise, when the temperature within the furnace 11 decreases the current flow induced in the secondary 36 decreases to rotate the reversible electric motor 14 in the opposite direction to move the carriage 16 to the left. Movement of the carriage 16 to the left makes the potential of the grid 83 less negative to increase the current flow induced in the secondary 36. When the current flow in the secondary 36 becomes equal to the current flow in the secondary 34 rotation of the reversible electric motor 14 is stopped. Accordingly the carriage 16 is positioned in accordance with the temperature condition existing within the furnace 11. It will be recognized that a fixed bias voltage may be utilized in conjunction with the variable bias obtained from battery 102 for controlling the potential of grid 83, if desired.

From the above it is seen that the carriage 16 assumes positions corresponding to the temperature condition within the furnace 11 and records these temperature conditions upon the chart 20. By adjusting either or both of the rheostats 88 and 100, the system may be calibrated so that the correct temperature conditions are exhibited.

As pointed out above the contacts 22 and 23 are positioned in accordance with the value of the temperature condition it is desired to maintain within the furnace 11. When the temperature in the furnace 11 decreases below the predetermined value, contact 21 engages contact 22 to complete a circuit from the line wire 41 through conductor 64, contacts 21 and 22, conductor 66, reversible electric motor 24 and conductor 67 to the line wire 42. This causes operation of the reversible electric motor 24 to operate the valve 25 towards an open position to increase the supply of fuel to the furnace 11. When the temperature within the furnace increases above the desired value, contact 21 engages contact 23 to complete a circuit from the line wire 41 through conductor 64, contacts 21 and 23, conductor 65, reversible motor 24 and conductor 67 to the line wire 42. This causes the reversible motor 24 to operate in the opposite direction to move the valve 25 towards a closed position to decrease the supply of fuel to the furnace 11. In this manner the temperature condition within the furnace 11 is maintained at any desired value.

Figure 2:
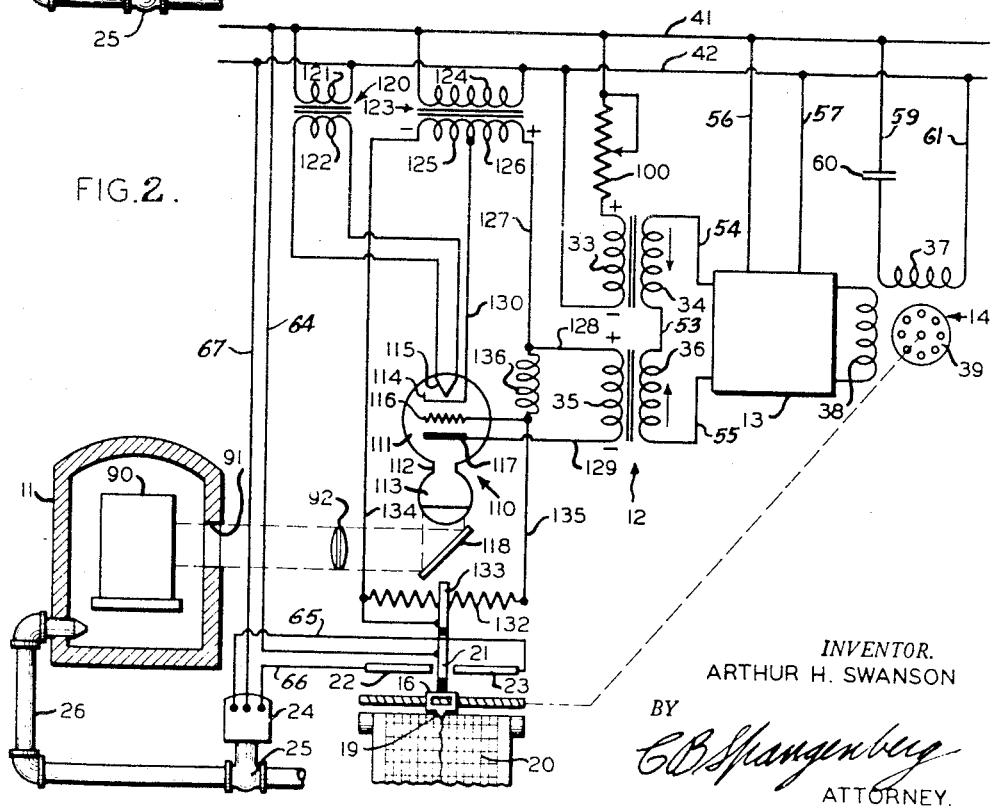
Fig. 2 illustrates diagrammatically another form of the invention which differs from Figure 1 by utilizing another form of condition responsive device.

The arrangement illustrated in Fig. 2 is substantially the same as the arrangement illustrated in Fig. 1, but utilizes a different type of electronic temperature responsive device. The electronic temperature responsive device in Fig. 2 is generally designated at 110 and comprises a double envelope having enlarged portions 111 and 113 and a connecting neck 112. Located in the enlarged portion 111 are a cathode 114, a cathode heater 115, a control grid 116, and an anode 117. Radiation from the mass 90 in the furnace 11 passes through opening 91 in the wall of the furnace 11 and is collected by a lens system 92 and applied by a mirror 118 to the enlarged portion 113 of the envelope. The enlarged portion 113 contains a volatile fluid or gas and the vaporization of this volatile fluid or expansion of the gas depends directly upon the amount of radiant energy affecting the same and hence upon the temperature condition within the furnace 11. Vaporization of the fluid effects the gas pressure within the envelope and the gas pressure inside of the envelope is directly dependent upon the temperature condition within the furnace 11. Since cathode emission of the gas type electronic device here illustrated is directly dependent upon the gas pressure therein the cathode emission depends directly upon the temperature condition existing within the furnace 11.

The cathode heater 115 is energized by a transformer 120 having a primary 121 connected across line wires 41 and 42 and a secondary 122 connected to the cathode heater 115. Alternating potentials are applied to the output circuit and the input or grid circuit of device 110 by means of a transformer 123 having a primary 124 connected across line wires 41 and 42 and secondaries 125 and 126.

During the first half cycle of the alternating potential it is assumed that the right end of the secondaries 125 and 126 is positive and at this time current flows through the output circuit extending from the secondary 126 through conductors 127 and 128, primary 35, conductor 129, anode 117, cathode 114 and conductor 130 to the transformer secondary 126. During the first half cycle current is, therefore, induced in the secondary 36 and flows upwardly in the direction indicated by the arrow. During the second half cycle the electronic temperature responsive device does not conduct but due to the construction of the transformer means 12 current flows downwardly through the secondary 36. The amount of current flow in the secondary 36 depends upon the gas pressure in the envelope of the electronic temperature responsive device and hence upon the temperature condition existing within the furnace 11.

Also during the first half cycle current flow is induced in the secondary 34 and flows downwardly at that time and during the second half cycle the induced current of the secondary 34 flows upwardly. The flows of current in the secondaries 34 and 36, therefore, oppose each other and when the current values are equal and opposite no signals are impressed upon the electronic amplifier 13 and hence the reversible motor 14 remains stationary. When the temperature condition within the furnace 11 increases the gas pressure in the electronic temperature responsive device increases to increase the current flow through the secondary 36 to place a signal on the electronic amplifier 13 which is in phase with the line voltage. This causes the reversible motor 14 to operate in a direction to move the carriage 16 to the right. Upon a decrease in the temperature condition in the furnace 11 the gas pressure in the electronic device 110 decreases to decrease the current flow induced in the secondary 36 whereupon a signal 180° out of phase with the line voltage is applied to the electronic amplifier 13 for operating the reversible motor in the opposite direction to move the carriage 16 to the left.

Here as in Fig. 1 the follow-up or rebalancing action is accomplished by controlling the grid of the electronic device 110, but the specific manner in which the grid is controlled in Fig. 2 is quite different from that of Fig. 1. The electronic device 110 of Fig. 2 being a gas discharge device conducts during the first half cycle when the anode is positive. The grid 116 is controlled by a phase shift bridge for determining the instant during the first half cycle at which the gas discharge device starts to conduct and, therefore, determines the average current conducted by the gas discharge device. The phase shift bridge includes in one arm between the cathode 114 and the grid 116 the transformer secondary 125, conductor 134, associated contact 133 and resistance 132, and conductor 135. In the other arm of the bridge between the cathode 114 and the grid 116 are the transformer secondary 126, conductor 127 and an inductance 136. The inductance 136 and the variable resistance formed of resistance element 132 and contact 133 are so arranged that by adjusting the resistance 132 the phase of the potential of the grid 116 is varied with respect to the phase of the potential of the line wires 41 and 42. By moving to the right the carriage 16 which carries the contact 133 the resistance value of the resistance 132 is decreased to retard the phase of the potential of the grid 116 relatively to the phase of the potential of the anode 117, whereupon the gas discharge device starts to conduct later during the first half cycle, thus decreasing the average current conducted by the discharge device. By moving the carriage 16 to the left to increase the value of resistance 132 the phase of the potential of the grid 116 with respect to the phase of the potential of the anode 117 is advanced whereby the gas discharge device is allowed to conduct earlier during the first half cycle.

When the temperature condition within the furnace 11 increases, the current flow induced in the secondary 36 increases to operate the reversible electric motor 14 to move the carriage 16 to the right. Movement of the carriage 16 to the right causes the gas discharge device to conduct later in the cycle whereby the current flow induced in the secondary 36 is decreased. When the current flow in the secondary 36 is decreased to a value corresponding to the current flow in the secondary 34 rotation of the reversible electric motor 14 is stopped. Likewise upon a decrease in the temperature condition within the furnace 11 current flow induced in the secondary 36 is decreased to cause the reversible electric motor 14 to operate in the opposite direction to move the carriage 16 to the left. Movement of the carriage 16 to the left increases the value of the resistance 132 to cause the gas discharge device to conduct earlier during the first half cycle. This increases the current flow induced in the secondary 36 and when the value of the resistance in the secondary 36 becomes equal to that induced in the secondary 34, the reversible electric motor 14 is stopped. Accordingly the carriage 16 is moved to a position corresponding to the value of the temperature condition existing within the furnace 11. Since the remainder of the system is the same as the system outlined above a further description of Fig. 2 is not considered necessary.

In the arrangements of Figs. 1 and 2 described above, the reversible electric motor 14 operates a carriage 16 which operates to follow-up or rebalance the system, which exhibits and records the value of the temperature condition existing within the furnace and which controls the supply of fuel to the furnace to maintain a desired temperature condition within the furnace. Of course the fuel supply control means may be omitted, if desired, and if recording is not desired the recording functions may be omitted. If recording and exhibiting is not desired it would be desirable to utilize the reversible motor 14 for operating directly the fuel valve 25 in addition to operating the follow-up or rebalancing means. This would provide a simple and accurate follow-up control system for maintaining desired conditions within the furnace 11.

While in accordance with the provisions of the statutes, I have illustrated and described the best form of this invention now known to me, it will be apparent to those skilled in the art that changes may be made in the form of the apparatus disclosed without departing from the spirit of this invention as set forth in the appended claims, and that in some cases certain features of this invention may sometimes be used to advantage without a corresponding use of other features.

Having now described this invention, what I claim as new and desire to secure by Letters Patent is:

1. In a temperature responsive system, the combination of, a source of alternating potential, a multiphase reversible electric motor including a power winding connected to the source of alternating potential and a control winding, transformer means controlling the control winding and including a pair of primaries, connections between the primaries and the source of alternating potential to energize oppositely the transformer means, electronic means, including an anode, a grid and a cathode directly affected by the temperature condition, included in said connections to vary relatively the opposite energizations of the transformer means to cause rotation of the reversible electric motor in one direction or the other, and means operated by the reversible electric motor for controlling the grid of the electronic means to vary relatively the energizations of the transformer means to equalize substantially the opposite energizations to stop rotation of the reversible electric motor.

2. In a temperature responsive system, the combination of, a source of alternating potential, a multiphase reversible electric motor including a power winding connected to the source of alternating potential and a control winding, transformer means controlling the control winding and including a pair of primaries, connections between the primaries and the source of alternating potential to energize oppositely the transformer means, electronic means, including an anode, a grid and a cathode directly affected by the temperature condition, included in said connections to vary relatively the opposite energizations of the transformer means to cause rotation of the reversible electric motor in one direction or the other, and means operated by the reversible electric motor for controlling the bias on the grid of the electronic means to vary relatively the energizations of the transformer means to equalize substantially the opposite energizations to stop rotation of the reversible electric motor.

3. In a temperature responsive system, the combination of, a source of alternating potential, a multiphase reversible electric motor including a power winding connected to the source of alternating potential and a control winding, transformer means controlling the control winding and including a pair of primaries, connections between the primaries and the source of alternating potential to energize oppositely the transformer means, electronic means, including an anode, a grid and a cathode directly affected by the temperature condition, included in said connections to vary relatively the opposite energizations of the transformer means to cause rotation of the reversible electric motor in one direction or the other, and means operated by the reversible electric motor for controlling the phase of the grid potential with respect to the phase of the anode potential of the electronic means to vary relatively the energizations of the transformer means to equalize substantially the opposite energizations to stop rotation of the reversible electric motor.

4. In a condition responsive system, the combination of, an electrical device, an electronic discharge device including an anode, a cathode and a grid, an output circuit including the anode and cathode for controlling the electrical device, means for controlling cathode emission in accordance with the value of the condition, and means controlled by the electrical device for controlling the grid.

5. In a temperature responsive system, the combination of, an electrical device, an electronic discharge device including an anode, a cathode and a grid, an output circuit including the anode and cathode for controlling the electrical device, means for subjecting the cathode to the temperature condition for controlling cathode emission in accordance with the value of the temperature condition, and means controlled by the electrical device for controlling the grid.

6. In a condition responsive system, the combination of, an electrical device, a gas discharge device including an anode, a cathode and a grid, an output circuit including the anode and cathode for controlling the electrical device, means for varying the pressure in the gas discharge device for controlling cathode emission in accordance with the value of the condition, and means controlled by the electrical device for controlling the grid.

7. In a condition responsive system, the combination of, a source of alternating potential, an electronic discharge device including an anode, a cathode and a grid, an output circuit including the source of alternating potential, the anode and cathode, means for controlling cathode emission in accordance with the value of the condition, an adjustable phase shifting bridge, and an input circuit including the adjustable phase shifting bridge, the source of alternating potential, the cathode and grid.

8. In a condition responsive system, the combination of, a source of alternating potential, a gas discharge device including an anode, a cathode and a grid, an output circuit including the source of alternating potential, the anode and cathode, means for varying the pressure in the gas discharge device for controlling cathode emission in accordance with the value of the condition, an adjustable phase shifting bridge, and an input circuit including the adjustable phase shifting bridge, the source of alternating potential, the cathode and grid.

9. In a temperature responsive system, the combination of a pair of terminals adapted to be connected to a source of alternating potential, a multiphase reversible electric motor including a power winding connected to said terminals and a control winding, transformer means controlling the control winding and including a pair of primaries, connections between the primaries and said terminals to energize oppositely the transformer means, electronic means, including an anode, a grid and a cathode directly affected by the temperature condition, included in said connections to vary relatively the opposite energizations of the transformer means to cause rotation of the reversible electric motor in one direction or the other, and means operated by the reversible electric motor for controlling the grid of the electronic means to vary relatively the energizations of the transformer means to equalize substantially the opposite energizations to stop rotation of the reversible electric motor.

10. In a temperature responsive system, the combination of a pair of terminals adapted to be connected to a source of alternating potential, a multiphase reversible electric motor including a power winding connected to said terminals and a control winding, transformer means controlling the control winding and including a pair of primaries, connections between the primaries and said terminals to energize oppositely the transformer means, electronic means, including an anode, a grid and a cathode directly affected by the temperature condition, included in said connections to vary relatively the opposite energizations of the transformer means to cause rotation of the reversible electric motor in one direction or the other, and means operated by the reversible electric motor for controlling the bias on the grid of the electronic means to vary relatively the energizations of the transformer means to equalize substantially the opposite energizations to stop rotation of the reversible electric motor.

11. In a temperature responsive system, the combination of a pair of terminals adapted to be connected to a source of alternating potential, a multiphase reversible electrical motor including a power winding connected to said teminals and a control winding, transformer means controlling the control winding and including a pair of primaries, connections between the primaries and said terminals to energize oppositely the transformer means, electronic means, including an anode, a grid and a cathode directly affected by the temperature condition, included in said connections to vary relatively the opposite energizations of the transformer means to cause rotation of the reversible electric motor in one direction or the other, and means operated by the reversible electric motor for controlling the phase of the grid potential with respect to the phase of the anode potential of the electronic means to vary relatively the energizations of the transformer means to equalize substantially the opposite energizations to stop rotation of the reversible electric motor.

ARTHUR H. SWANSON.